UNITED STATES PATENT OFFICE.

SIGISMUND COHNÉ, OF LONDON, GREAT BRITAIN.

IMPROVEMENT IN PROCESSES FOR THE MANUFACTURE OF MATERIAL FOR BEARINGS.

Specification forming part of Letters Patent No. 166,188, dated August 3, 1875; application filed April 21, 1874.

*To all whom it may concern:*

Be it known that I, SIGISMUND COHNÉ, a resident at London, Kingdom of Great Britain, have invented a new Composition for Axle, Shaft, Spindle, and other similar Bearings, and the Manufacture of Bearings therefrom, of which the following is a specification:

My invention consists in the making of a composition of bad heat-conducting materials, as hereinafter described, and in the making therefrom of bearings not requiring any lubricating, such bearings being applicable for all kinds of engines and machinery, railway and other cars, and wheeled vehicles.

For the making of this composition, I take of asbestus about seventy-five per centum, and of plumbago about twenty-five percentum. Both these materials are well ground and well mixed together. I then add such a quantity of liquid silicate of soda or liquid silicate of potash as to produce, with the materials above named, a semi-dry paste. This paste is then pressed under hydraulic or other pressure, so as to convert it into a hard mass. This mass is then dried either by heat or by exposure in the open air until all humidity is evaporated. Out of this mass is the bearing cut or turned. The bearing may be, instead, directly pressed out of the semi-dry paste into the shape required for a mold or die, and then dried. In either case the bearing produced is dipped into hot melted paraffine or ozocerite, or into a solution of paraffine in benzole, or other mineral oil, in order that all the pores in the compound of which the bearing is made may be filled with the said paraffine or ozocerite; or the bearing may be placed in an exhaust or vacuum chamber, and the paraffine or ozocerite thus introduced.

I have hereinabove stated the proportions in or about which I make the composition; but I do not confine myself strictly thereto, but may somewhat vary them to suit the particular class of bearing for which the composition is to be used.

Having now particularly described and ascertained the nature of my said invention for a new composition for axle, shaft, spindle, and other similar bearings, and the manufacture of bearings therefrom, I wish it to be clearly understood that

What I claim, and desire to secure by Letters Patent, is—

The process of making a material for bearings for general purposes by mixing well together ground asbestus and plumbago, and making therefrom a semi-dry paste by the mixture therewith of liquid silicate of soda or liquid silicate of potash, then drying the said paste and immersing it in, or causing it to absorb, hot melted paraffine or ozocerite, or a solution of paraffine in benzole, substantially as herein specified.

SIGISMUND COHNÉ.

Witnesses:
MATTHEW AUGUSTUS SOUL,
WALTER JOHN TURNER.